United States Patent
Frank (10) Patent No.: US 6,754,799 B2
(45) Date of Patent: Jun. 22, 2004

(54) SYSTEM AND METHOD FOR INDEXING AND RETRIEVING CACHED OBJECTS

(75) Inventor: Alexander Frank, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/855,958

(22) Filed: May 16, 2001

(65) Prior Publication Data

US 2002/0178341 A1 Nov. 28, 2002

(51) Int. Cl.$^7$ ................................................ G06F 12/00
(52) U.S. Cl. ................................... 711/216; 711/118
(58) Field of Search ................................ 711/118, 216, 711/205; 709/203; 707/500

(56) References Cited

U.S. PATENT DOCUMENTS

| | | | | |
|---|---|---|---|---|
| 5,748,961 A | * | 5/1998 | Hanna et al. | 395/701 |
| 6,128,623 A | * | 10/2000 | Mattis et al. | 707/103 |
| 6,389,460 B1 | * | 5/2002 | Stewart et al. | 709/217 |
| 6,453,319 B1 | * | 9/2002 | Mattis et al. | 707/100 |
| 6,453,404 B1 | * | 9/2002 | Bereznyi et al. | 711/171 |

* cited by examiner

Primary Examiner—Kimberly Mclean-Mayo
(74) Attorney, Agent, or Firm—Leydig, Voit & Mayer, Ltd.

(57) ABSTRACT

A system and method for indexing and retrieving objects stored in a cache on a persistent medium (e.g., a disk) introduces the concepts of probable hits and asynchronous retrieval of cached objects during a search. Each index entry is a "bucket" for holding corresponding cached objects whose keys are convertible by means of a lossy compression mechanism to an identification ("ID") of the index entry. When a request for a data object is received, the cached objects in the bucket of the index entry corresponding to the requested object key are checked to see if any of them is the requested object. For a cached object likely to be the requested object, an asynchronous retrieval operation is performed to retrieve that cached object from the persistent medium, and its key is compared with the requested object key. To further reduce the memory space required for implementing the index, a lightweight synchronization scheme is used instead of conventional semaphore objects. This synchronization scheme uses a short access status field (e.g., 2 bytes) that is settable to indicate a locking status of the index entry due to its involvement in read/write operations.

19 Claims, 6 Drawing Sheets

SYSTEM AND METHOD FOR INDEXING AND RETRIEVING CACHED OBJECTS

TECHNICAL FIELD OF THE INVENTION

This invention relates generally to computer data storage and retrieval, and more particularly to the indexing and retrieval of objects stored in a cache.

BACKGROUND OF THE INVENTION

A cache is an amount of data storage space that is used to hold recently accessed data to allow quick access in subsequent references. The retrieval of data from the cache is typically significantly faster than accessing a data source from which the data in the cache are originally obtained. By storing recently accessed data in the cache, the data can be retrieved and made available quickly the next time they are requested. Data caching is one of the most fundamental concepts in the computer science and has been widely applied in various applications where it is desired to minimize the data access time. The effective implementation of a cache system is, however, not a simple matter, especially when the cache space and the number of cached data objects become very large.

For instance, in the context of accessing information available from the World Wide Web ("WWW") on the Internet, it is common for a proxy server of a private network to cache data objects downloaded from various Websites in response to requests by computers on the private network. When the proxy server receives a request from a computer on the private network for a particular data object, it checks the cache (often referred to as the "cache unit") to see whether the requested object is already in the cache. If the requested object is not in the cache, the proxy server forwards the request on to the Internet so the requested data object can be downloaded from a Website. On the other hand, if the requested data object is found in the cache (which is called a "cache hit"), it is retrieved from the cache and sent to the requesting computer. In this way, the need to keep the user waiting while the requested data object is being downloaded through the Internet is avoided. Since the speed of downloading data objects from Websites can be very slow, a properly implemented cache unit can significantly reduce the average amount of time for a user to receive a requested data object, thereby providing a significantly improved user experience.

The performance requirements on the cache unit, however, can be very high. For instance, a typical implementation of a cache unit may be expected to hold up to 50 millions data objects. With such a large number of data objects, it can become very difficult to control the amount of resources required for implementing the various components of the cache system or to guarantee the adequate performance of the caching operation.

For instance, like many database systems, a cache system typically sets up an index for the cached objects to allow the identification and retrieval of the cached objects. A conventional indexing scheme typically has one index entry for each of the cached objects, and the entry contains a key that identifies the object and typically includes other data describing the object. For instance, in the context of caching objects downloaded from the Internet, the key for a downloaded object is the object's URL (Universal Resource Locator), the size of which may vary from a few bytes to several hundred bytes or more. The average size of the URLs of the downloaded objects has been observed to be around 50 bytes at the present state of Internet usage, but is expected to grow larger as more and more contents are put on the Internet.

When the number of objects is large and the data describing each object is relatively large, the index can take up a large amount of storage space. For example, if the cache is expected to hold 50 millions of downloaded objects and the average URL size is about 50 bytes, about 2.5 gigabytes will be required just for storing the keys of the cached objects. Moreover, semaphore objects (or alternative synchronization objects) are typically provided for controlling access to the cached objects. The use of semaphore objects further increases the memory space requirement of the conventional indexing scheme.

Conventional cache systems that support such a large scale of operation would have to store the index onto a hard disk or the like because of the large amount of storage space required for the index. Putting the index on a disk, however, has the significant disadvantage that extra disk I/O operations are required to access the index. For instance, when a request for a data object is received, a disk I/O operation will be performed to read the index, which returns either a found object (i.e., a cache hit) or and indication that the object is not found (i.e., a cache miss). For a cache system that aims at high performance, it is necessary to minimize the average number of I/O operations for each object search and retrieval, and adding an I/O operation for each index search may not be an acceptable option.

SUMMARY OF THE INVENTION

In view of the foregoing, the present invention provides a system and method for indexing and retrieving objects stored in a cache on a persistent medium (e.g., a disk) that introduces the concepts of probable hits and asynchronous retrieval of cached objects during a search. An index according to the invention is much smaller than a conventional index such that it can be stored in the computer memory to avoid any additional I/O operations. Rather than having a separate entry in the index for each cached object and storing a full key (e.g., a URL) in each entry, each index entry is used as a "bucket" for holding object references, including access information (e.g. pointers), for cached objects corresponding to that index entry. Specifically, each index entry has an index entry identification (("ID"), and any cached object corresponding to that entry has a key that when operated on by a predefined lossy compression mechanism results in the index entry ID. Because the compression mechanism is lossy, there may be multiple cached objects that correspond to a given index entry.

When the cache manager receives a request for a data object, it checks whether the requested object is already stored in the cache. To that end, the key of the requested object is compressed to get the ID of the relevant index entry, and that index entry is checked to see if there is any cached object in that "bucket". Finding an empty bucket indicates that the requested object is not in the cache (i.e., a cache miss). If the bucket contains object reference information for one or more cached objects, the cached objects are checked to see whether one of them is the requested object. If a cached object in the bucket is possibly the requested object, an asynchronous I/O operation is performed to retrieve that cached object to see whether its key matches the key of the requested object. Because of the retrieval is performed asynchronously, the thread that makes the request to retrieve a cached object in the cache does not have to wait for the completion of the I/O read operation before it can turn to other tasks.

To further reduce the amount of memory space required for implementing the index, a lightweight synchronization scheme is used instead of conventional semaphore objects. This scheme uses a short state field (e.g., 2 bytes) in each index entry that is set to indicate whether the index entry is involved in read/write operations.

Additional features and advantages of the invention will be made apparent from the following detailed description of illustrative embodiments, which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may be practiced in distributed computing environments where tasks are performed by remote processing devices that are linked through a communications network. In a distributed computing environment, program modules may be located in both local and remote memory storage devices.

Figure 1:
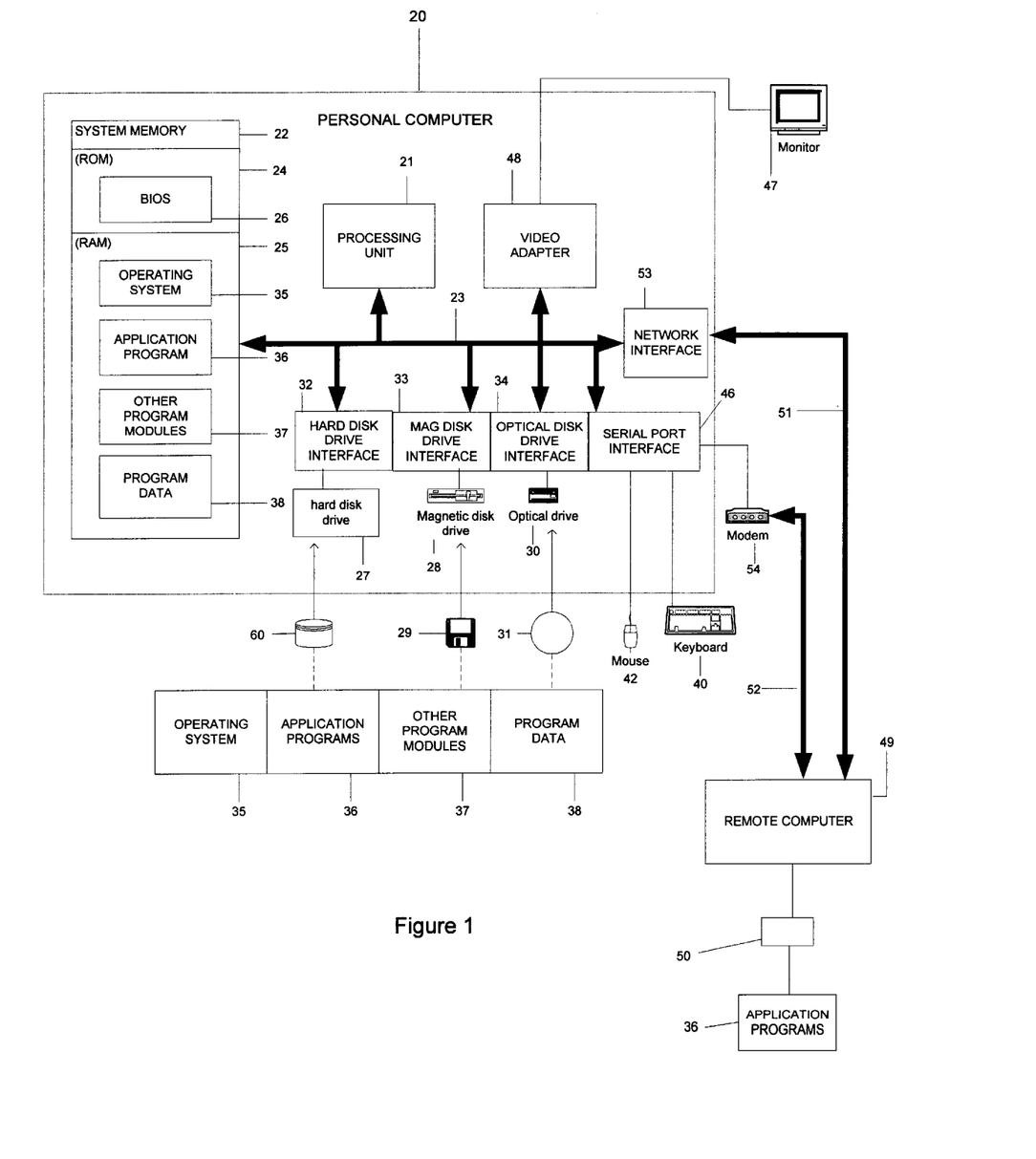
FIG. 1 is a block diagram generally illustrating an exemplary computer system on which the present invention may be implemented.

The following description begins with a description of a general-purpose computing device that may be used in an exemplary system for implementing the invention, and the invention will be described in greater detail with reference to FIGS. 2–6. Turning now to FIG. 1, a general purpose computing device is shown in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk 60, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the person computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing con-text, it is not meant to be limiting as those of skill in the art will appreciate that various of the acts and operation described hereinafter may also be implemented in hardware.

Figure 2:
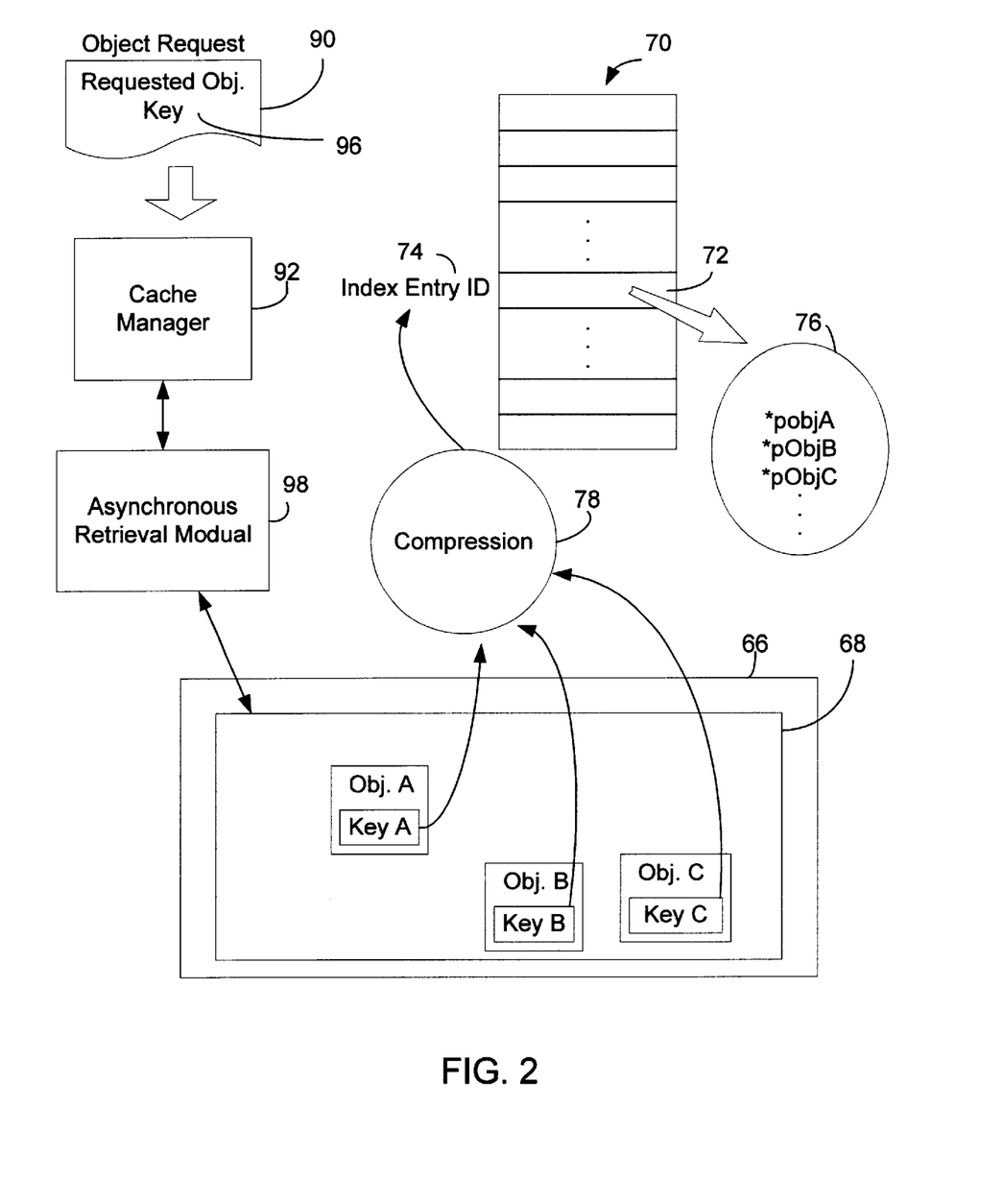
FIG. 2 is a schematic diagram illustrating a cache object indexing and retrieval scheme in accordance with the invention.

Turning now to FIG. 2, the present invention is directed to a new approach to the indexing and retrieval of cached objects stored on a persistent medium 66, such as a hard disk. Under this approach, the size and complexity of the index 70 for the cache 68 are significantly reduced such that the index is sufficiently small to be stored in the main memory of the computer, thereby avoiding the need to perform extra I/O operations for accessing the index. To enable the significant reduction of the size of the index and to avoid unnecessary delays caused by I/O operations, the present invention introduces the concepts of probable hits and asynchronous retrieval of cached objects during a search.

With respect to the first concept, rather than providing a separate entry for each cached object and storing all the data describing the object in that entry, each index entry 72 in the index provides a "bucket" for holding object reference information for a plurality of cached objects that correspond to the entry. The object reference for each of the corresponding cached object includes access information that can be used to locate that object. The index entry, however, does not contain the full key for each of the corresponding cached objects. The key is stored only with the cached object (e.g., the cached object A) in the persistent storage medium. Thus, for a given requested object, the access information in the "bucket" of a corresponding index entry may not tell directly whether that requested object is in the cache. It may be necessary to retrieve the cached objects corresponding to that index entry using the access information in the object references in the bucket in order to determine whether one of the cached objects is the object requested. This scheme is in sharp contrast to conventional indexing schemes where an index should have sufficient data to indicate whether a requested object has been cached or not without having to read any of the cached objects.

Specifically, in accordance with the invention, each entry 72 in the index 70 has an identification ("ID") 74, and the bucket 76 of that entry is used to hold all cached objects whose keys correspond to the entry ID. This correspondence is established by a "lossy" compression mechanism 78 that transforms the key of each of the corresponding objects into the index entry ID 74. The word "lossy" means that there may be multiple input values that correspond to an output value of the compression mechanism. Due to the multiple-to-one relationship between the inputs and outputs of the compression mechanism, there may exist a plurality of object keys that correspond to a given index entry ID.

For a given index entry, its "bucket" may hold object reference information for zero, one, or more corresponding cached objects, depending on whether any object with a key compressible into the index entry ID happens to have been stored in the cache 68. The object reference for each cached object in the bucket includes access information that specifies how & from where the cached object can be retrieved (e.g. which hard disk, location on the disk and the object size, etc.). The format and content of the object references and the bucket abstract data structure depend on the particular implementation. For instance, the object references for the cached objects in a bucket may be arranged as a heap, a unified tree, or a linked list of pointers, etc. By using the access information in the index entry, each of the cached objects in the bucket can be retrieved.

When a request 90 for a data object is received from a client, a cache manager 92 uses the index 70 to determine whether the requested object is in the cache. First, the key 96 of the requested object as specified in the request 90 is compressed using the compression function 78 to provide an index entry ID. If the requested object is already in the cache, then it should be in the bucket of the index entry with that entry ID. If the bucket is empty, then no object with a key corresponding to the entry ID has been cached. This, of course, means that the requested object is not in the cache, i.e., there is a cache miss. On the other hand, if the bucket is not empty, the cache manager then retrieves the object references in the bucket of that index entry and uses the access information in the references to check the associated cached objects until either it finds a cached object whose key matches that of the requested object (i.e., a cache hit) or it determines that none of the cached objects is the requested object (i.e., a cache miss).

As mentioned above, each index entry 72 does not contain the full keys of the cached objects in its bucket 76. Thus, to ascertain whether a cached object (e.g., the object A) in the bucket is the requested object, that cached object may have to be retrieved from the cache space 68 in the persistent storage medium 66 and put into the computer main memory to allow a comparison of its key with the requested object key to see whether there is a match. As will be described in greater detail below in connection with a preferred embodiment, in some implementations the conversion from a cached object key to the index entry ID may involve some intermediate stage of compression. The results of that intermediate stage of compression may be stored and used in the search process to determine that some cached objects in the bucket are not the requested object due to a mismatch with the intermediate compression result of the requested object key, without having to read those cached objects from the persistent medium. Nevertheless, if the intermediate compression is lossy, then finding a match between the intermediate key compression result of a cached object with that of the requested object is still insufficient to tell whether that cached object is the requested object. In that case, an I/O operation would have to be performed to retrieve that cached object to obtain its key for comparison with the key of the requested object.

As will be described in greater detail below, the compression mechanism is preferably set up such that the probability of the retrieved object being different from the request object is very small. In other words, when an object is retrieved from the persistent medium, it is highly likely to turn out to be the requested object (i.e., a cache hit). Thus, each I/O operation is likely, although not guaranteed, to result in a cache hit. This helps to keep the number of I/O operations spent on retrieving wrong objects small so that it would not significantly offset the benefit of storing the index in the computer main memory.

In accordance with another feature of the invention, the I/O operations for retrieving cached objects are performed in an asynchronous manner. Thus, a thread that makes a retrieval request for a cached object in the cache does not have to wait for the completion of the I/O read operation for the cached objects to be compared and retrieved. Instead, after making the request, the thread can move on to other tasks. The object retrieval is handled by an asynchronous retrieval module 98. When it completes the retrieval and comparison, the asynchronous retrieval module preferably either returns data indicating a miss if the retrieved object is not the requested object, or returns the retrieved object if it is the requested object.

With the general concept of the invention described above, the following description is directed to an embodiment in which the cache is a cache unit used by a proxy server for caching objects downloaded from the World Wide Web ("WWW") on the Internet. It will be appreciated, however, that the cache object indexing and retrieval according to the invention can be effectively applied in a variety of caching applications. Also, in the embodiment described below, the cache space is managed in a unique FIFO manner. It will be appreciated, however, that the invention can be used in cache systems with different types of cache space management.

Figure 3:
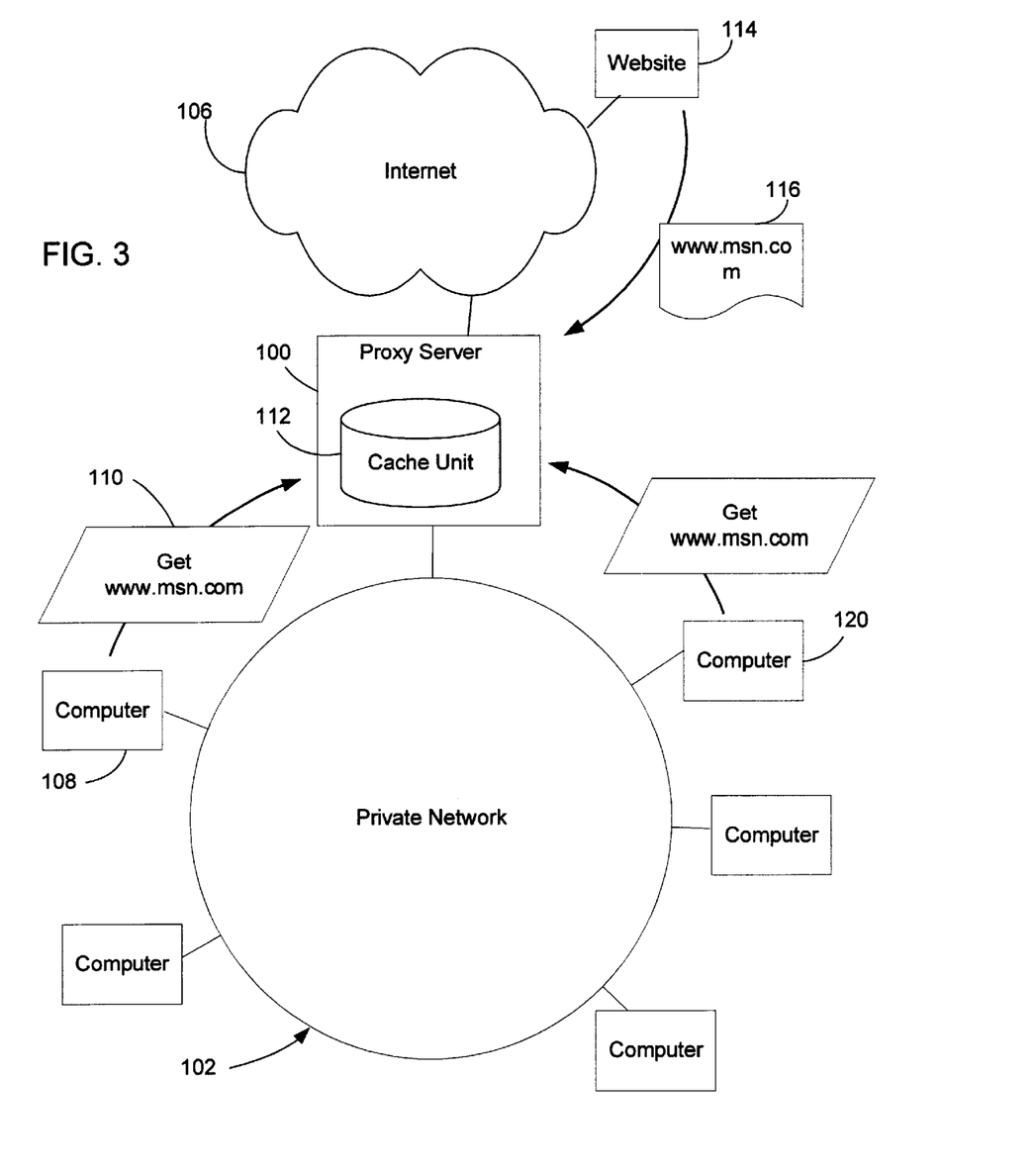
FIG. 3 is a schematic diagram showing an embodiment in which a proxy server uses a cache unit for storing data objects downloaded from the Internet.

Turning now to FIG. 3, in this embodiment, the proxy server 100 resides on a private network 102, such as a corporate network or a home network. The proxy server 100 is connected to the Internet 106 and functions as the gateway/firewall for the private network. When a computer 108 on the private network makes a request 110 for downloading a data object from the Internet, that request is sent to the proxy server 100. The requested data object is identified by a URL, which is used as the key of the object for purposed of caching. For example, the requested data object may be the Web page corresponding to the URL www.msn.com.

When the proxy server 100 receives the request 110, it checks the cache unit 112 to see whether there is an object in the cache unit that corresponds to the URL. If so, the proxy server retrieves the data object and sends it to the requesting computer 108. If the requested object is not in the cache 112, the proxy server 100 forwards the download request 110 to the Internet 106. The request is then routed to a pertinent Website 114, which transmits the requested data object 116 to the proxy server 100. The proxy server 100 stores the downloaded data object in the cache unit 112 and also sends it to the requesting computer 108.

Later, if the proxy server 100 receives another request for the same data object from the same computer 108 or a different computer 120, it can provide the object from the cache without having to download the object from the Internet again. Downloading a data object from the Internet often takes a long time, especially when the connection is slow. The proxy can provide the requested data object quickly if there is a cache hit.

Figure 4:
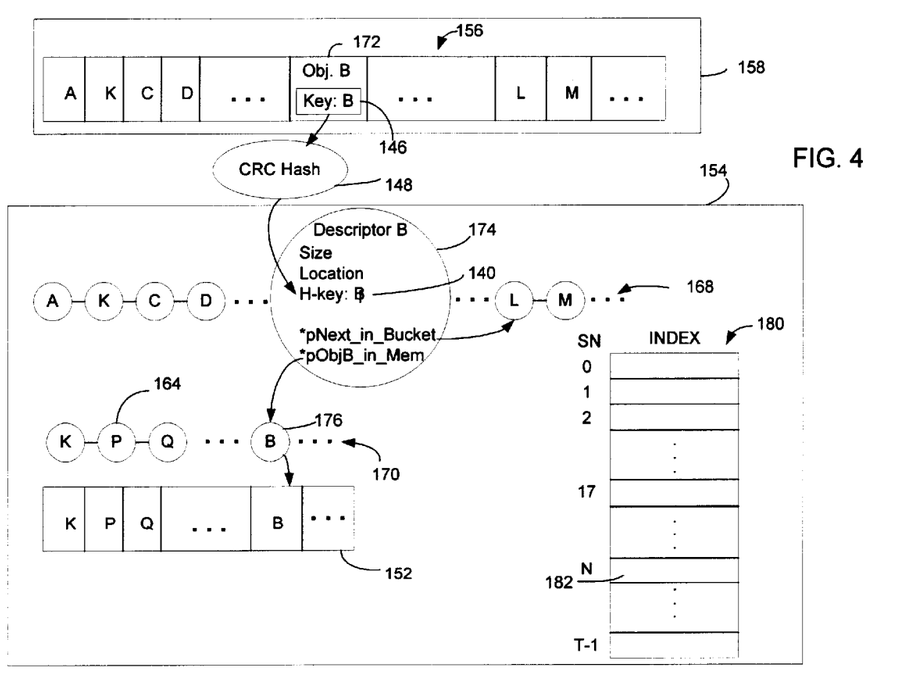
FIG. 4 is a schematic diagram showing data structures in an embodiment involved in the indexing and retrieval of cached objects.

FIG. 4 illustrates data structures involved in the cache object indexing and retrieval. In this embodiment, cached objects are stored in a cache space 156 provided by a hard disk 158. Each cached object includes its URL, which is used as the key of that object. The cache system also has a cache space 152 in the main memory 154 of the computer. Unless specified otherwise, the cache space in the main memory is referred to hereinafter as the "memory cache space", and cache space on the hard disk as the "disk cache space." The memory cache space 152 is used as a buffer for storing downloaded data objects that are to be stored into the disk cache space 156. The memory cache space 152 is also used to store objects that are being served to clients. Such objects are typically read from the disk cache space 156 into the memory cache space 152.

To keep track of the objects in the disk cache space, each object has an associated descriptor 174, which is stored in main memory 154. The descriptors for the cached objects in the disk space are formed into a linked list 168 according to the locations of the corresponding objects in the disk space. Similarly, objects in the memory cache space 152 have their corresponding descriptors 176, which are also formed in to a linked list 170.

Each descriptor in the disk descriptor list or the memory descriptor list includes data specifying the size of the object block and its location in the cache space. For instance, the location of a block 172 in the disk cache space 156 is given in the corresponding disk descriptor 174 as the offset of the block from the zero position of the disk cache space. If the object exists in both the disk cache space 156 and the memory cache space 152, the disk block descriptor 174 also contains a pointer that points to the memory block descriptor 176, which points to the corresponding memory block 178. The memory block descriptor likewise has a pointer that points to the corresponding disk block descriptor.

In accordance with a feature of the embodiment, each descriptor 174 contains a hashed key 140 ("H-key") of the key 146 of its associated object. As described above, for purposes of identifying objects downloaded from the Internet, the URL of each object is used as its key. The H-key for a data object is a number generated by applying a CRC (cyclical redundancy check) hashing function 148 to the URL of the object. The hashing function preferably is one that spread of the hashed keys evenly over the domain between zero and $2^{\wedge}Nbits-1$, where Nbits is the number of bits in the H-key. In a preferred embodiment, Nbits is select to be 32. Since a URL typically includes more than 32 bits, the conversion of a URL (i.e., the original key) into the H-key is a form of lossy compression, and the compression ratio can be quite significant. As described below in greater detail, the generation of an H-key is an intermediate step of the overall compression scheme of the embodiment for converting a URL into an index entry ID.

To enable the functions of searching for and retrieving cached objects stored in the cache, the cache unit system includes an index 180, which supports the primitive insert and find functions. Generally, an insert operation gets as parameters a key and a pointer to the corresponding element, and inserts this pair into the index container. A find operation receives as a parameter a key of a desired element, and searches for it in the index container. If it finds the desired element, it returns that element. The URL and H-Key in the preferred embodiment are specific examples of an abstract key, and the abstract element is placed by a reference to a cached object.

In keeping with the concept of the invention, rather than having a separate entry in the Index for each cached object and storing all the data describing the object in that entry, the index is set up to allow a multiple-to-one correspondence between cached objects and each index entry 182. As described above, each index entry 182 is used as a bucket for holding object references for cached objects whose keys are converted into the entry ID of that entry by means of a compression mechanism.

In the illustrated embodiment, the conversion from the H-key of a cached object into the corresponding entry ID is through the function: sn=H-key % T, where the operation symbol "%" means the modulus operation, T is the number of cells or entries in the index, and sn is the serial number of the index entry that corresponds with H-key. In this case, the serial number of the index entry is the entry ID. Thus, each index entry points to a bucket of those cached objects whose keys correspond to serial number of the entry. It will be appreciated that this scheme is efficient in memory usage. With the index entry number T tuned properly, the bucket sizes are small in average, which leads to O(1) time complexity to access any particular entry.

It can be seen that the compression mechanism used in the illustrated embodiment includes two stages. The first stage is the conversion of the original keys, namely URLs, into the H-keys stored in the descriptors, and the second stage is the conversion of the H-keys into the serial number of the corresponding index entry. Each stage of this compression mechanism is lossy: there may be multiple URLs that correspond to each H-key value, and there may be multiple H-key values that correspond to the serial number of an index entry. As a result, there may be more than one cached object in one "bucket." By way of example, all cached objects that satisfies the condition of H-key % T=17 are placed in the bucket with cell serial number sn=17. That bucket may, of course, be empty if no object with H-key % T=17 has been cached.

The bucket of each index entry, which is conceptually a container, may be implemented in various manners, such as a heap, a unified tree, or a linked list, etc. In a preferred embodiment, each bucket is implemented as a linked list of descriptors that is sorted by the H-key values of the cached objects in the bucket. Specifically, referring to FIG. 5, to minimize the size of the data contained in the index table, each index entry 190 contains only a pointer 192 to the descriptor 194 of the first cached object (e.g., the object A) in the "bucket" rather then all the pointers in the linked list. That descriptor 194 in turn contains a pointer 196 to the descriptor 198 (e.g., the object B) for the next cached object in the "bucket," and so on. In this way, a linked list of pointers is formed. It is sorted by the H-key (to ease navigation in the list). The search for the requested object involves going through the descriptors using the linked list of pointers until either the requested object is found in the cache or it is determined that none of the cached objects in the bucket is the requested object.

Figure 5:
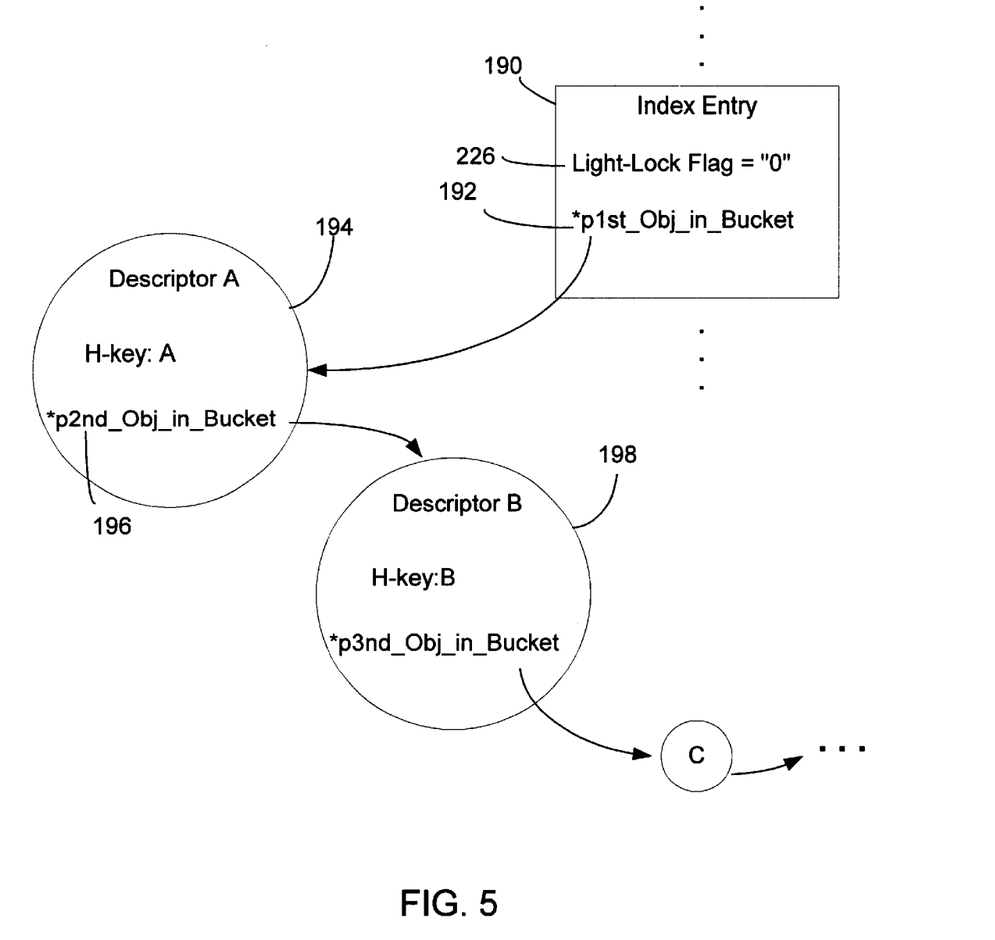
FIG. 5 is a schematic diagram showing the linking of descriptors for cached objects corresponding to an index entry.
Figure 6:
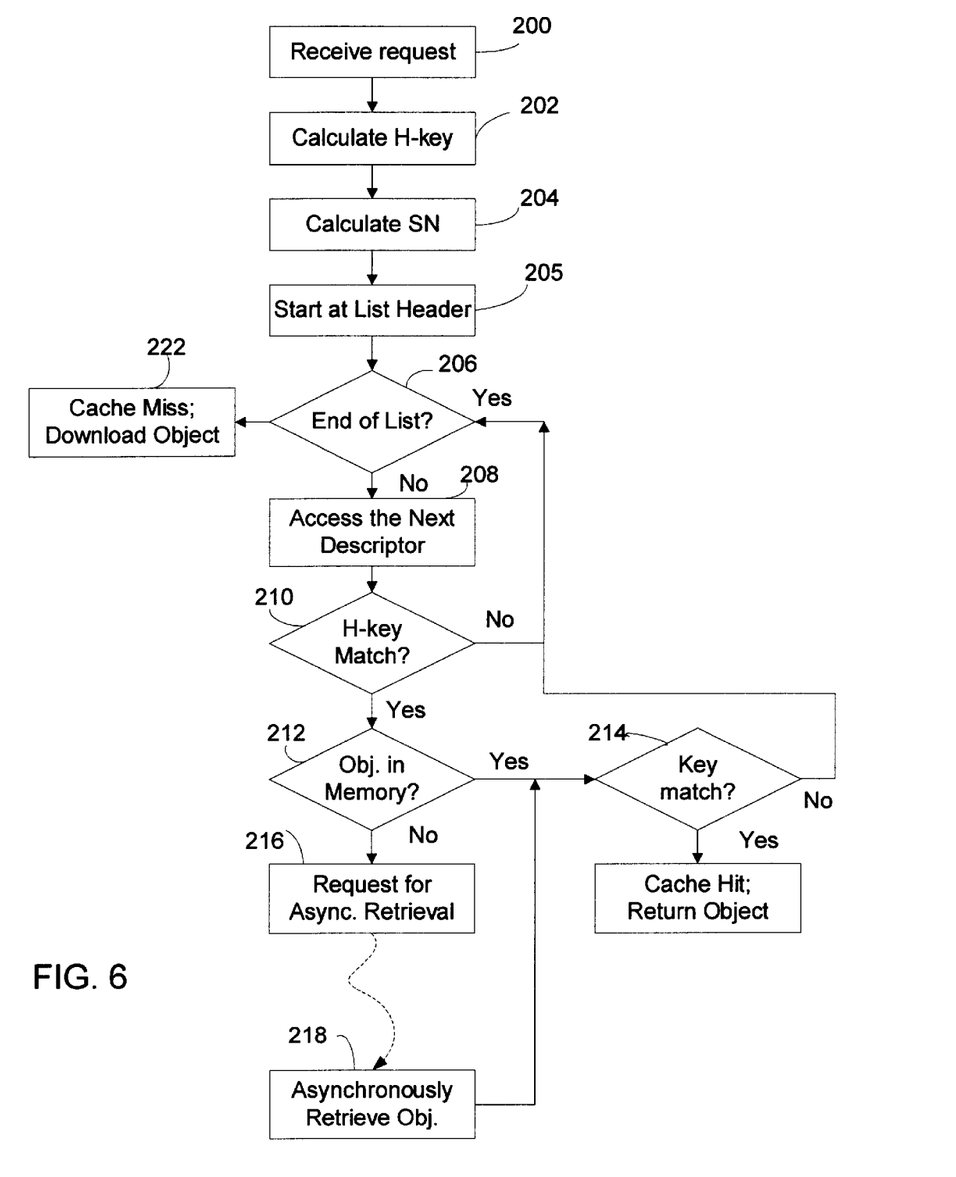
FIG. 6 is a flowchart showing steps for an operation of searching the cache for a requested object in an embodiment based on the cache system architecture of FIGS. 4 and 5.

The operation of searching for a requested object in the cache is now described with reference to FIG. 6. When a request for an objet with a given key (i.e. URL) is received (step 200), that key is compressed, yielding the requested object's H-key. That H-key is then used to calculate the serial number of the corresponding index entry as described above (step 204). At this point, an iterative search over the linked list in the bucket is started. The search cursor points now to the list header (step 205) (equivalent to 190 in FIG. 5). The linked list of index entry is checked to see whether the search cursor is at the list end (step 206), which is indicated by a "null" pointer as the first pointer on the list. As described above, the first pointer on the linked list is stored in the index entry. If the first item is a null, the bucket is empty, meaning that there is no cached object corresponding to that index entry. In other words, there is a cache miss.

On the other hand, if the list is not empty, the descriptor pointed to by the next pointer on the list is accessed (step 208). The H-key stored in that descriptor is then compared with the H-key of the requested object to see whether there is a match (step 210). If they do not match, the cached object associated with that descriptor is not the requested object. In this way, the H-keys are used to filter out non-hit cached objects without having to retrieve them from the disk.

On the other hand, if the H-key in the descriptor matches the H-key of the requested object, there is a high probability that the cached object associated with the descriptor is the requested object. This, however, does not guarantee a cache hit, because in some rare occasions different URLs of cached and requested objects may be compressed to the same H-key value. Accordingly, the cached object, or at least a portion of it containing the real key, has to be retrieved so that its key can be compared with the key of the requested object to verify a match.

To that end, it is first determined whether the cached object happens to be also in the memory cache (step 212). If the object is in the memory, there is no need to retrieve the object from the disk. The object in the memory is accessed to determine whether its key matches that of the requested object (step 214). If so, there is a cache hit, and the search function returns a pointer to the cached object in the memory. If not, the cached object is not the requested object. It is then determined whether there is another pointer on the linked list (step 206). If so, the search moves onto the descriptor pointed to by the next pointer in the linked list.

If, however, it is determined that the cached object is not concurrently stored in the memory (step 212), an asynchronous retrieval request is made for the cached object with the matching H-key (step 216). The retrieval request specifies the location of the cached object to be retrieved as well as the key of requested object. After placing the asynchronous request, the thread performing the search can then turn to other tasks without having to wait for the response to come back.

When the asynchronous retrieval request is completed by the hard disk, the retrieved cached object is put in the memory cache space, and the retrieve completion routine is called by the operating system (step 218). It transfers control to step 214, in which the retrieved key is compared with the key of the requested object. If there is a match, there is a cache hit. The asynchronous retrieval module than retrieves the entire cached object (if needed) and put it in the memory cache space, and returns a pointer to the object in the memory to the context of the request that originated the retrieval request. It should be noted that from the abstraction level the object is first verified, then read from the persistent media. In reality, the object is speculatively read, then compared. If matched, the subsequent abstract read attempt is just a logical operation.

On the other hand, if the retrieved key does not match the requested object key, there is a false hit. The asynchronous retrieval module returns an indication of no match to the thread that made the retrieval request. The thread than checks whether there is another cached object in the bucket (step 206), i.e., whether the next pointer in linked list is not a null pointer. If pointer is not null, the descriptor pointed to by that pointer is accessed, and its H-key is compared with the H-key of the requested object. This process continues until either the end of the linked list of pointers for the bucket is reached (i.e., a cache miss) or a matching cached object is found (i.e., a cache hit). In case of a cache miss, the proxy server forwards the object request to the Internet (step 222) so that the requested object can be downloaded from a responsive Website.

It should be appreciated that when there is an H-key match the probability for a cache hit is so high that practically the complexity considerations may ignore the "false hits". This is because although theoretically it is possible for a cached object and a requested object with different URLs to happen to have the same H-key, such a situation is rarely encountered in real-world operations. Moreover, it is also rare for a bucket to contain several entries with the same H-key. Again, the occurrence of this situation is so rare that it has negligible impacts on the overall complexity of the indexing and retrieval scheme.

As another feature of the implemented embodiment, to minimize the memory requirement for indexing, the implementation does not use conventional semaphore objects for synchronizing access by multiple requests or threads. Instead, the synchronization is achieved by using a light-weight locking mechanism that puts a short access status field in the Index entry to indicate its access-locking status. Retuning to FIG. 5, in one implementation, the status field 226, which is also called a "light-lock flag", takes only two bytes. When a certain bucket is to be read or modified, the entry ID of the corresponding index entry is determined from the key of the object to be handled. When a thread is about to read the bucket, a LockRead function is called. This function checks the light-lock flag in the index entry. If the flag indicates that the index entry is being modified (e.g., flag="ffff"), the LockRead function returns a "false" value, indicating that the bucket of the index entry is undergoing a modification and as a result the read activity cannot proceed. If, on the other hand, the flag indicates that the index entry is not accessed by any request (e.g., flag="0") or is accessed for one or more reads, the flag is incremented by 1 to indicate the number of read activities the index entry is involved in. The LockRead function then returns a "true" value, indicating that the read operation can proceed.

To get the right to modify the bucket, a LockWrite function is called. This function checks the light-lock flag of the corresponding index entry. If the flag indicates that index entry is not currently involved in any request (e.g., flag="0"), the flag is changed to the value indicating that a bucket modification is to be performed (e.g., flag="ffff"), and a "true" value is returned to indicate that the modification can proceed. If the flag indicates, however, that index entry is busy, then a "false" value is returned to indicate that the bucket modification cannot proceed.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

What is claimed is:

1. A computer-readable medium having computer-executable instructions for performing steps for searching for a requested object in a stored in a persistent medium cache and containing a plurality of cached objects, comprising:

compressing a key of the requested data object to form a hashed key for the requested object;

deriving from the hashed key of the requested data object an entry identification for an index entry in an index for the cache, wherein each cached object has a descriptor, and wherein the index entry contains information leading to descriptors for cached objects having keys corresponding to the entry identification;

accessing the index entry with the entry identification for determining whether there is any cached object having a key corresponding to the entry identification;

when there is at least a first cached object corresponding to said entry identification, obtaining from said index entry with the entry identification a pointer to a descriptor of the first cached object;

accessing the descriptor for the first cached object to obtain a hashed key for the first cached object;

determining whether the hashed key for the first cached object matches the hashed key for the requested object;

when the hashed keys of the requested object and the first cached object match, asynchronously retrieving a key of the first cached object from the persistent medium;

comparing the key of the first cached object with the key of the requested object to determine whether there is a match;

if the keys of the first cached object and the requested object do not match, checking whether the descriptor of the first cached object contains a pointer to a descriptor for a second cached object having a key corresponding to the index entry with the entry identification;

if there is a pointer to a descriptor for a second cached object corresponding to the index entry with the entry identification, accessing the descriptor for the second cached object to obtain a hashed key for the second cached object;

determining whether the hashed key for the second cached object matches the hashed key for the requested object;

when the hashed keys of the requested object and the second cached object match, asynchronously retrieving a key of the second cached object from the persistent medium; and comparing the key of the second cached object with the key of the requested object to determine whether there is a match.

2. A computer-readable medium as in claim 1, wherein the persistent medium is a disk.

3. A computer-readable medium as in claim 2, having further computer-executable instructions for performing the steps of:

after determining that the hashed keys of the requested object and the first cached object match, locating the first cached object in a main computer memory; and accessing the first cached object in the main computer memory to obtain the key of the first cached object for comparison with the key of the requested object, instead of performing the step of asynchronously retrieving.

4. A computer-readable medium as in claim 1, wherein the index entry contains a synchronization status field settable for indicating a locking status of the index entry due to involvement of the index entry in read/modify activities.

5. A computer-readable medium as in claim 1, wherein the key of the requested object is a URL.

6. A computer-readable medium as in claim 5, wherein the cache contains cached objects downloaded from the Internet.

7. A computer-readable medium having a computer-readable data structure containing data for searching for and retrieving cached objects in a cache, comprising:

a plurality of descriptors each associated with a cached object stored in the cache, each cache object being identified by a key and the associated descriptor for said each cached object containing a hashed-key generated by compressing the key of said each cached object;

an index having a plurality of index entries, each index entry identified by an entry identification and containing information for leading to descriptors having hashed keys that correspond to the entry identification, wherein the entry identification of said each index entry is a serial number of said each index entry, and wherein the hashed keys of the descriptors correspond to the serial number by means of a modulus function.

8. A computer-readable medium as in claim 7, wherein the information contained in said each index entry includes a pointer to a descriptor for a first cached object having a hashed key corresponding to the entry identification.

9. A computer-readable medium as in claim 8, wherein the descriptor for the first cached object includes a pointer to a descriptor for a second cached object having a hashed key corresponding to the entry identification.

10. A computer-readable medium as in claim 7, wherein said each index entry contains a synchronization status field settable for indicating a locking status of said each index entry due to involvement of said each index entry in read/modify activities.

11. A computer-readable medium having computer-executable instructions for performing steps for searching for a requested object in a cache stored on a persistent medium, comprising:

compressing a key of the requested data object to provide an entry identification for an index entry in an index for the cache;

accessing the index entry of the entry identification for information for leading to cached objects having keys corresponding to the index entry having the entry identification, wherein the index entry contains a synchronization status field settable for indicating a locking status of the index entry due to involvement of the index entry in read/modify activities;

when there is at least a first cached object corresponding to said index entry, asynchronously retrieving a key of the first cached object from the persistent medium;

comparing the key of the first cached object with the key of the requested object to determine whether there is a match;

if the keys of the first cached object and the requested object do not match, checking whether there is a second cached object corresponding to the index entry with the entry identification; and if there is a second cached object corresponding to the index entry with the entry identification, repeating the steps of asynchronously retrieving and comparing on the second cached object.

12. A computer-readable medium as in claim 11, wherein the persistent medium is a disk.

13. A computer-readable medium as in claim 12, having further computer-executable instructions for performing the steps of:

determining that the first cached object exists in a main computer memory; and accessing the first cached object in the main computer memory to obtain the key of the first cached object for comparison with the key of the requested object, instead of performing the asynchronously retrieving step.

14. A computer-readable medium as in claim 11, having further computer-executable instructions for performing the steps of:

obtaining a hashed key for the first cached object generated by compressing the key of the first cache object;

determining whether the hashed key for the first cached object matches a hashed key for the requested object;

performing the asynchronously retrieving step when the hashed keys of the requested object and the first cached object match.

15. A computer-readable medium as in claim 14, wherein the index entry contains information leading to a linked list of pointers pointing to descriptors for cached objects having keys corresponding to the entry identification, each of said descriptor containing a hashed key for an associated cached object.

16. A computer-readable medium as in claim 15, wherein the index entry having the entry identification contains a pointer to the descriptor of the first cached object.

17. A computer-readable medium as in claim 16, wherein the descriptor of the first cached object contains a pointer for a descriptor for a second cached object having a key corresponding to the entry identification.

18. A computer-readable medium as in claim 11, wherein the key of the requested object is a URL.

19. A computer-readable medium as in claim 18, wherein the cache contains cached objects downloaded from the Internet.

* * * * *